United States Patent [19]

Veronesi et al.

[11] Patent Number: 4,550,941

[45] Date of Patent: Nov. 5, 1985

[54] HYDRAULIC DRIVE MECHANISM

[75] Inventors: Luciano Veronesi, O'Hara Township, Allegheny County; Donald G. Sherwood, Monroeville, both of Pa.

[73] Assignee: Westinghouse Electric Corp., Pittsburgh, Pa.

[21] Appl. No.: 217,055

[22] Filed: Dec. 16, 1980

[51] Int. Cl.[4] .............................................. G21C 7/16
[52] U.S. Cl. ................................ 294/86.4; 294/86.15; 294/906; 403/31; 376/230; 376/233; 376/203; 376/260
[58] Field of Search ............... 376/230, 233, 235, 236, 376/337, 227, 203, 353, 231; 294/86 A, 86.17, 86.33, 86.15; 403/31, 322

[56] References Cited

U.S. PATENT DOCUMENTS

| | | | |
|---|---|---|---|
| 2,764,131 | 9/1956 | Knights | 376/230 X |
| 3,079,323 | 2/1963 | Hawke | 204/193.2 |
| 3,212,980 | 10/1965 | Kmonk et al. | 376/233 |
| 3,595,748 | 7/1971 | Frisch | 176/36 |
| 3,651,742 | 3/1972 | Winders | 376/230 X |
| 3,751,334 | 8/1973 | Sturmer et al. | 376/227 |
| 3,775,246 | 11/1973 | Frisch et al. | 376/230 |
| 3,778,345 | 12/1973 | Maslenok | 176/36 R |
| 3,857,599 | 12/1974 | Jones et al. | 376/233 |
| 3,901,546 | 8/1975 | Piazza et al. | 294/86.15 |
| 3,932,215 | 1/1976 | Kruger | 376/335 X |
| 3,945,886 | 3/1976 | Derevyankin et al. | 376/335 |
| 4,001,078 | 1/1977 | Doll | 376/335 X |
| 4,092,213 | 5/1978 | Nishimura | 326/230 X |
| 4,118,275 | 10/1978 | Carleton et al. | 326/230 |
| 4,147,589 | 4/1979 | Roman et al. | 376/233 |
| 4,192,558 | 3/1980 | Wade | 308/6 R |
| 4,204,910 | 5/1980 | Koshkin et al. | 294/86 A |

FOREIGN PATENT DOCUMENTS

| | | | |
|---|---|---|---|
| 1950646 | 4/1971 | Fed. Rep. of Germany | 376/230 |
| 295308 | 4/1965 | Netherlands | 294/86 A |
| 1073557 | 6/1967 | United Kingdom | 376/230 |

OTHER PUBLICATIONS

Richard Ballantine, *Richard's Bicycle Book*, 1972, pp. 106–135.

Primary Examiner—Richard E. Schafer
Assistant Examiner—Daniel Wasil
Attorney, Agent, or Firm—L. A. DePaul

[57] ABSTRACT

The hydraulic drive mechanism comprises an hydraulically actuated rod drive mechanism that cooperates with a pivotable latching mechanism. The pressurized reactor coolant is utilized to raise the drive rod into contact with and to pivot the latching mechanism so as to allow the drive rod to pass the latching mechanism. The pressure in the housing is then equalized which allows the drive rod to move downwardly into contact with the latching mechanism but remain in a raised position with respect to the reactor core. Once again, the reactor coolant pressure may be utilized to raise the drive rod and thus pivot the latching mechanism so that the drive rod passes above the latching mechanism. Again, the mechanism pressure can be equalized which allows the drive rod to fall and pass by the latching mechanism so that the drive rod approaches the reactor core.

9 Claims, 11 Drawing Figures

HYDRAULIC DRIVE MECHANISM

This application is related to copending U.S. patent application Ser. No. 217,056 filed Dec. 16, 1980 in the name of L. Veronesi entitled "Latching Mechanism" and is assigned to the Westinghouse Electric Corporation.

BACKGROUND OF THE INVENTION

This invention relates to hydraulic drive mechanisms and more particularly to hydraulic drive mechanisms for driving reactivity control mechanisms in nuclear reactors.

As is well known in the art, a nuclear power plant generates electricity from heat produced by fissioning of nuclear material. The nuclear material is contained within fuel assemblies which comprise the core of a nuclear reactor. As the reactor coolant is circulated through the nuclear reactor core heat is transferred from the core to the reactor coolant which is then conducted to a remote location for generating steam and electricity in a conventional manner.

Control of the nuclear reactor is usually achieved by control rods which are dispersed throughout the nuclear reactor core and are mounted for movement into and out of the core. The control rods function by absorbing excess neutrons produced by the nuclear reaction. In addition to control rods, a nuclear reactor may also have displacer rods disposed therein which are also mounted for movement into and out of the core to effect reactivity of the core as described in copending U.S. patent application Ser. No. 217,060 filed Dec. 16, 1980 in the name of W. J. Dollard et al. entitled "Mechanical Spectral Shift Reactor" and assigned to the Westinghouse Electric Corporation.

After a period of operation of a nuclear reactor, it is necessary to be able to access and replace the spent fuel assembles in the reactor with fresh fuel assemblies. During this operation, it is necessary to remove the reactor vessel closure head so as to be able to access the fuel assemblies in the nuclear reactor core. Since the control rods and displacer rods are attached to their respective drive mechanisms which are mounted on the reactor vessel closure head, it is expedient to disconnect the control rods and displacer rods from their corresponding drive mechanisms before removing the reactor vessel closure head while maintaining the control rods and displacer rods in the nuclear reactor core.

The ability of leaving the control rods and displacer rods in the nuclear reactor core during refueling may be achieved by providing a disconnect mechanism between the control rod and the control rod drive mechanism. One such disconnect mechanism is disclosed in U.S. Pat. No. 4,147,589, entitled "Control Rod for a Nuclear Reactor", issued Apr. 3, 1979 in the name of W. G. Roman et al. and assigned to the Westinghouse Electric Corporation. In the patent to Roman et al., there is described a control rod assembly for a nuclear reactor having a remotely disengageable coupling between the control rod and the control rod drive shaft. The coupling is actuated by first lowering then raising the drive shaft. The described motion causes actual repositioning of a pin in a grooved rotatable cylinder, each being attached to different parts of the drive shaft which are axially movable relative to each other. While the patent to Roman et al. describes one mechanism for disconnecting a drive mechanism from a reactivity control mechanism in a nuclear reactor, there is needed an alternative and simple mechanism for effecting such a disconnection.

SUMMARY OF THE INVENTION

The hydraulic drive mechanism comprises an hydraulically actuated rod drive mechanism that cooperates with a pivotable latching mechanism. The pressurized reactor coolant is utilized to raise the drive rod into contact with and to pivot the latching mechanism so as to allow the drive rod to pass the latching mechanism. The pressure in the housing is then equalized which allows the drive rod to move downwardly into contact with the latching mechanism but remain in a raised position with respect to the reactor core. Once again, the reactor coolant pressure may be utilized to raise the drive rod and thus pivot the latching mechanism so that the drive rod passes above the latching mechanism. Again, the mechanism pressure can be equalized which allows the drive rod to fall and pass by the latching mechanism so that the drive rod approaches the reactor core.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENTS

During the refueling of nuclear reactors, it is advantageous to disconnect rod drive mechanisms from the drive rods when the reactor vessel closure head is removed for refueling. In order to accomplish this, it is necessary to have a disconnect mechanism between the rod drive mechanisms and the drive rod. The invention described herein is a device for removing and inserting reactivity control rods in a nuclear reactor while allowing the drive rod to be disconnected from the drive mechanism during the refueling process.

Figure 1:
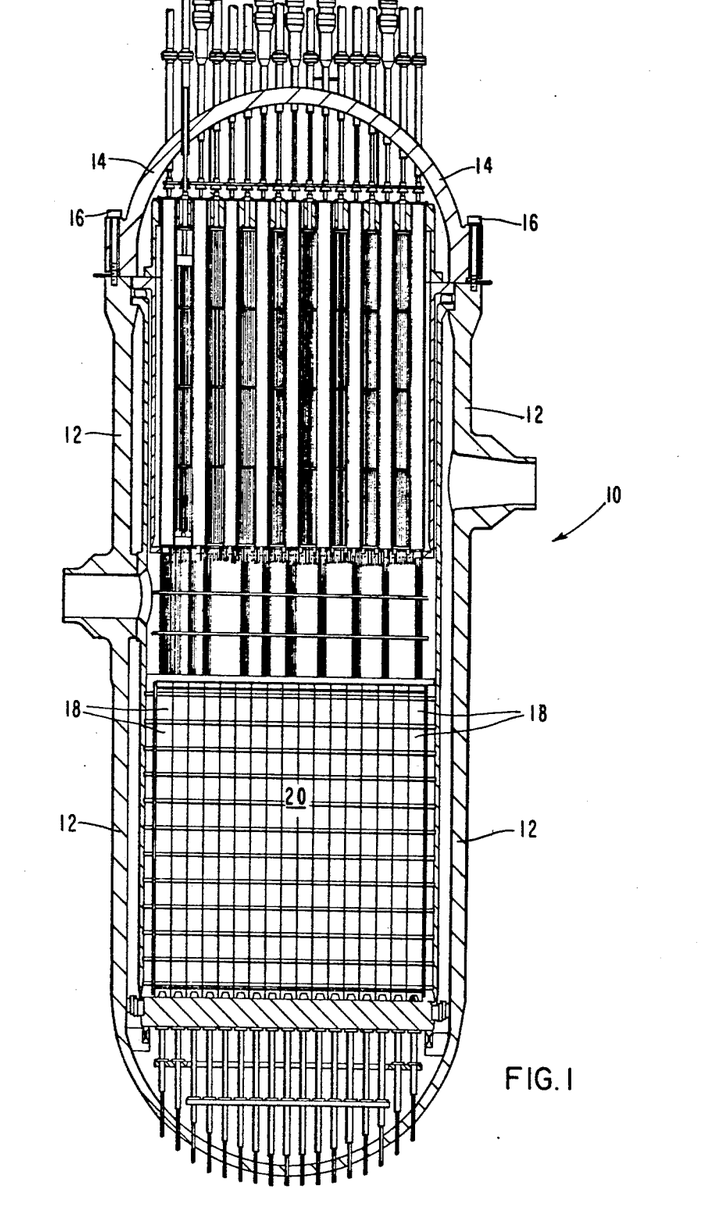
FIG. 1 is a partial cross-sectional view in elevation of a nuclear reactor.
Figure 2:
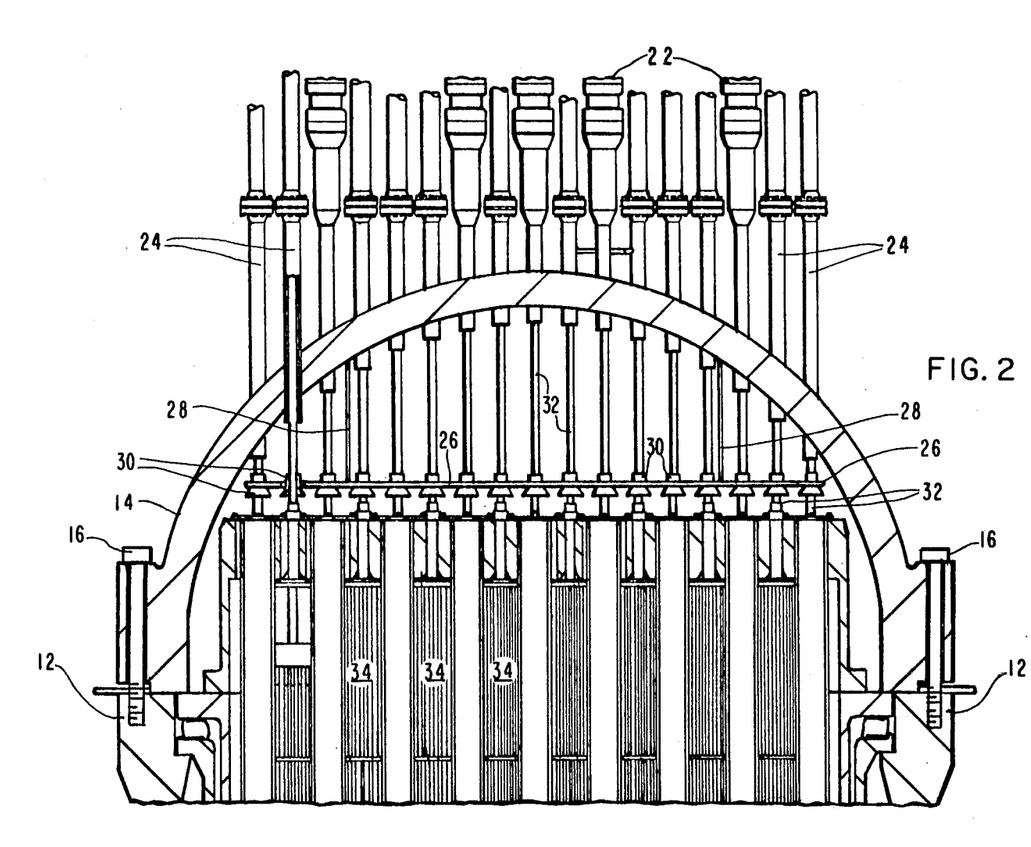
FIG. 2 is a cross-sectional view in elevation of the top portion of the nuclear reactor.

Referring to FIGS. 1 and 2, the nuclear reactor is referred to generally as 10 and comprises a reactor vessel 12 having a removable closure head 14 attached to the top thereof by means of bolts 16. A plurality of fuel assemblies 18 are disposed within reactor vessel 12 and comprise reactor core 20. A plurality of control rod drive mechanisms 22 which may be of the type generally used in the art are mounted on and extend through closure head 14 for inserting and removing control rods (not shown) from fuel assemblies 18 as is well understood in the art.

Still referring to FIGS. 1 and 2, a plurality of displacer rod drive mechanisms 24 are also attached to and extend through closure head 14. A plate 26 is suspended from the inside of closure head 14 by supports 28. A multiplicity of funnel-shaped guide members 30 are attached to plate 26 and are arranged in line with each of the control rod drive mechanisms 22 and displacer rod drive mechanisms 24. Each guide member 30 has a hole therethrough that allows a drive rod 32 to be slidably disposed therein. Each drive rod 32 is either attached at its lower end to a cluster of displacer rods 34 and capable of being attached at its upper end to a displacer rod drive mechanism 24 or attached at its lower end to a cluster of control rods (not shown) and at its upper end to a control rod drive mechanism 22. The arrangement of control rods and displacer rods may be such as that described in copending U.S. patent application Ser. No. 217,060 filed Dec. 16, 1980 in the name of W. J. Dollard et al. entitled "Mechanical Spectral Shift Reactor". Each drive rod 32 whether attached to a control rod drive mechanism 22 or a displacer rod drive mechanism 24, is capable of being disengaged from either its respective displacer rod drive mechanism 24 or control rod drive mechanism 22 so that closure head 14 may be removed carrying with it the control rod drive mechanisms 22, displacer rod drive mechanism 24 and plate 26 with guide members 30 attached thereto. Closure head 14 may be removed during the refueling process to replace spent fuel assemblies 18 with fresh ones. The disconnectability of drive rod 32 from its respective drive mechanism enables this to be easily accomplished. When it is time to replace closure head 14, guide members 30 aid in aligning each drive rod 32 with its respective drive mechanism so that when closure head 14 is placed on reactor vessel 12, each drive rod 32 slides through its respective guide member 30 and into its respective drive mechanism.

Figures 3, 4:
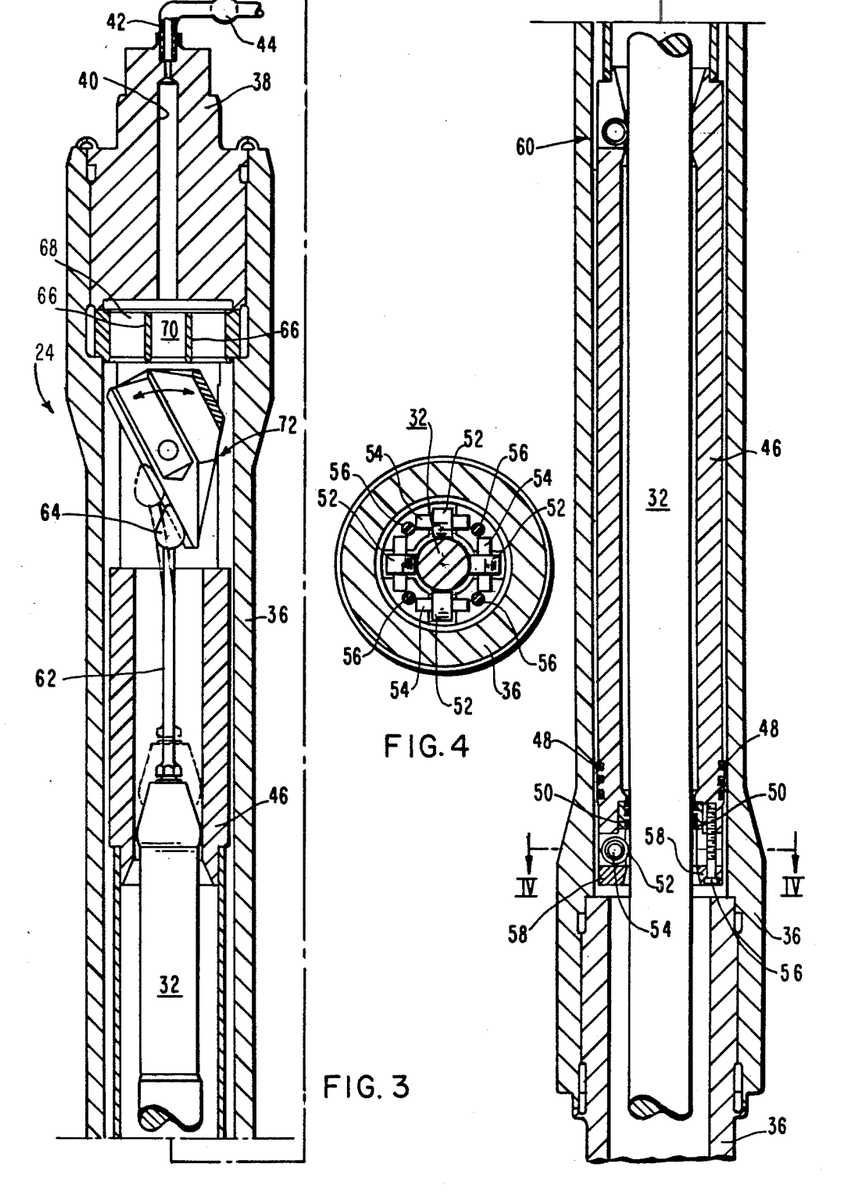
FIG. 3 is a cross-sectional view in elevation of the drive mechanism.
FIG. 4 is a view along line IV—IV of FIG. 3.

Referring now to FIG. 3, displacer rod drive mechanism 24 comprises a substantially cylindrical metal housing 36 which is welded to and extends through closure head 14. Housing 36 has a cap 38 attached to the top thereof which has a channel 40 therethrough that is connected to conduit 42. Conduit 42 is connected to cap 38 and to a tank (not shown) and has a flow regulating valve 44 displaced therein. Since the interior of housing 36 is exposed to the interior of reactor vessel 12, the reactor coolant fills the void spaces within housing 36 and flows through conduit 42 when valve 44 is open. A bearing housing 46 is removably disposed within housing 36 and has a plurality of first piston rings 48 attached to the outside thereof near its lower end which extend into contact with the inside of housing 36 for aligning bearing housing 46 within housing 36 but allowing for the removal of bearing housing 46. Drive rod 32 is slidably disposed within bearing housing 46 in a manner so as to be able to be moved axially with respect to bearing housing 46 and housing 36 under the influence of the reactor coolant pressure. A plurality of second piston rings 50 which may be Inconel are removably disposed within bearing housing 46 so as to be able to contact drive rod 32. Second piston rings 50 provide a mechanism for allowing drive rod 32 to slide within bearing housing 46 while limiting the flow of reactor coolant through bearing housing 46 and housing 36 when valve 44 is open. In this manner, the movement of drive rod 32 can be controlled by opening and closing valve 44. Second piston rings 50 are arranged so that they may be replaced when bearing housing 46 is removed from housing 36.

Referring now to FIGS. 3 and 4, a plurality of roller bearings 52 are disposed on a like number of axles 54 in a manner so as to allow the outer surface of roller bearings 52 to contact the outer surface of drive rod 32 while allowing the rotation of roller bearings 52. As shown in FIG. 4, four roller bearings 52 may be used so as to align drive rod 32 within bearing housing 46 while aiding in the movement of drive rod 32. A plurality of screws 56 corresponding to the number of roller bearings 52 are used to attach holding member 58 to bearing housing 46 so as to hold roller bearings 52 within bearing housing 46 yet allow replacement thereof by removal of screws 56 and holding member 58. In a like manner, a second set of roller bearings 60 are disposed at the other end of bearing housing 46 to provide alignment of drive rod 32.

Referring again to FIG. 3, drive rod 32 has a flexible rod 62 attached to the top end thereof which may be an Inconel rod. Flexible rod 62 has a spear-shaped member 64 attached to the top end of it. A hollow cylindrical divider 66 is attached to the lower end of cap 38 and in colinear alignment with channel 40. Divider 66 defines at least three chambers in the bottom end of cap 38 such as first chamber 68 and second chamber 70 that are of the size to accommodate spear 64.

Figure 5:
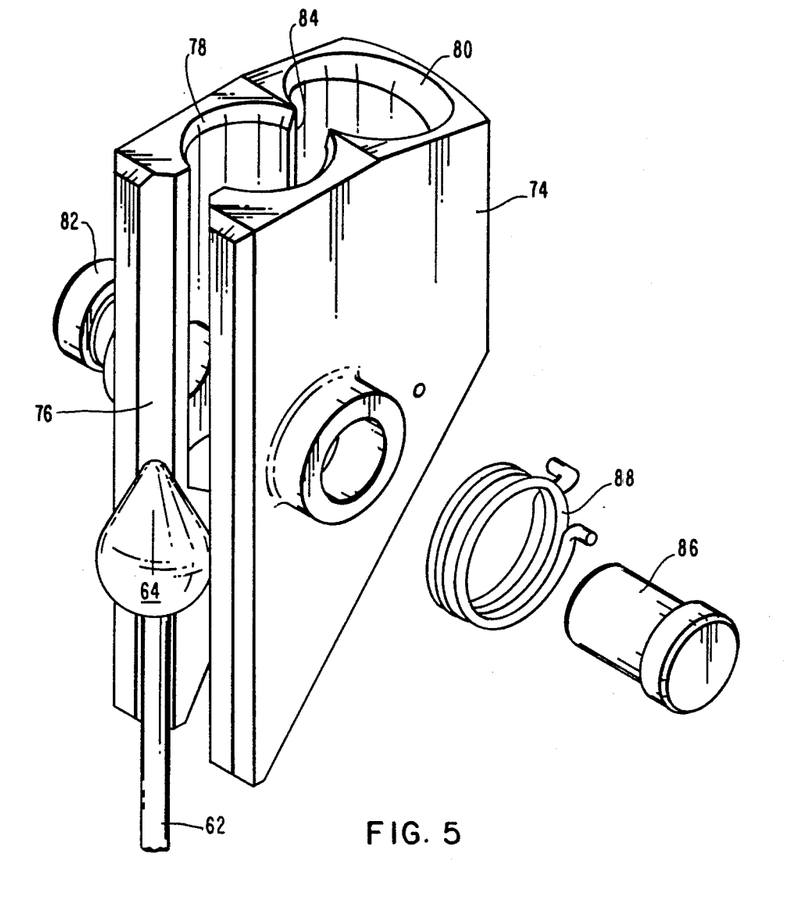
FIG. 5 is an exploded view in perspective of the latching mechanism.
Figures 6, 7:
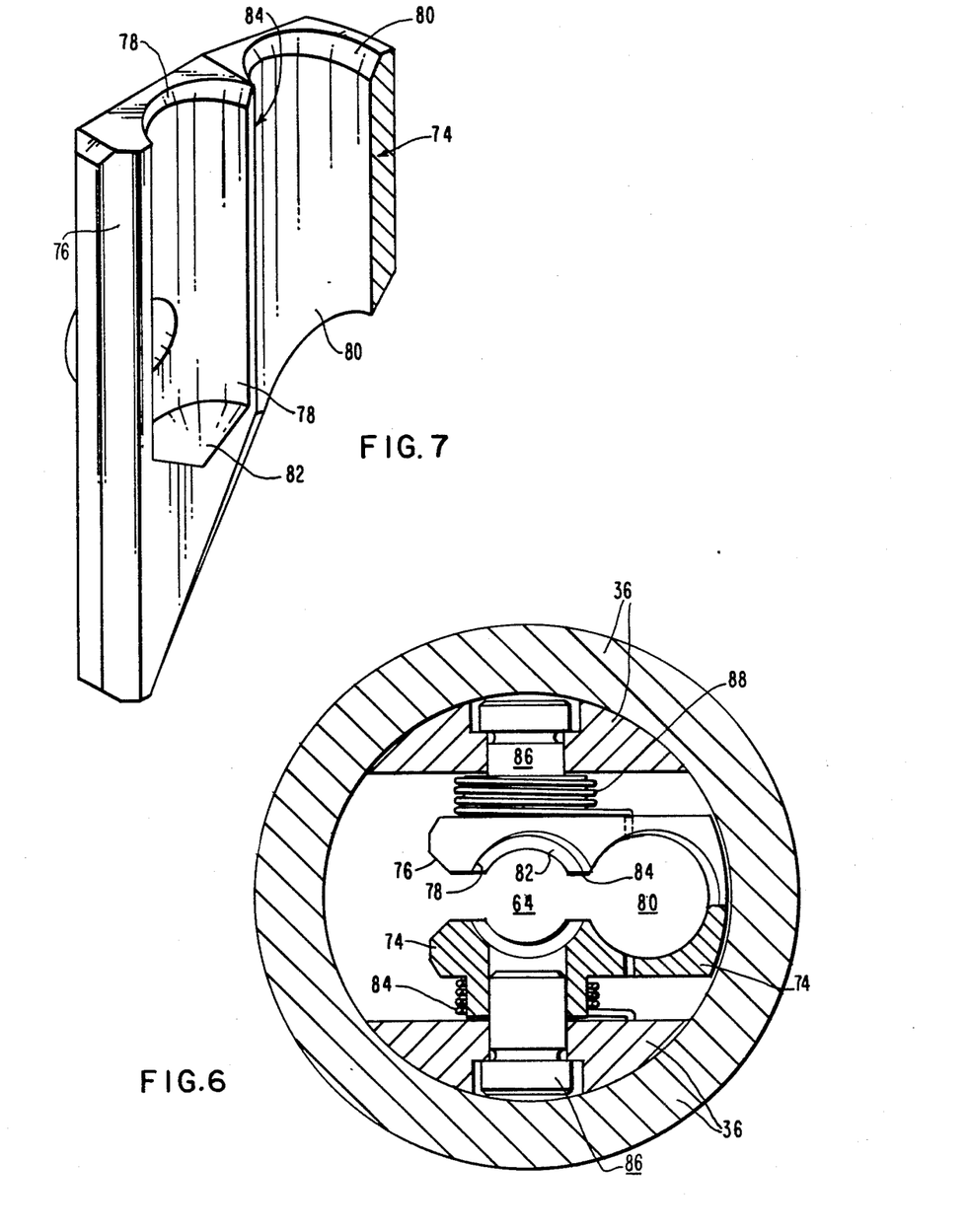
FIG. 6 is a cross-sectional view of the latching mechanism.
FIG. 7 is a cross-sectional view of the latching mechanism.

Referring now to FIGS. 3, 5, 6 and 7, a latching mechanism 72 is disposed within housing 36 and adjacent to first chamber 68 and second chamber 70 and comprises a metal pivotable member 74 having a first slot 76 extending the entire length of one side. First slot 76 is of the size small enough to prevent spear 64 from passing therethrough but of a size large enough to allow flexible rod 62 to pass therethrough. Pivotal member 74 also has a first bore 78 and a second bore 80 in the top end thereof with first bore 78 capable of being aligned with first chamber 68 and second bore 80 capable of being aligned with second chamber 70 when pivotal member 74 is properly pivoted. First bore 78 extends to near the bottom of pivotal member 74 and has a ledge 82 at its lower end. Whereas, second bore 80 extends the entire length of pivotal member 74. A second slot 84 is defined between first bore 78 and second bore 80 which also is of a size small enough to prevent spear 64 from passing throughout but of a size large enough to allow flexible rod 62 to pass therethrough. Two pins 86 each having one end rotatably disposed within pivotal member 74 and each having their other end rotatably disposed within housing 36 allow pivotal member 74 to pivot within and relative to housing 36 as shown in FIG. 6. A plurality of biasing means 88 which may be coil springs, are disposed around each pin 86 and are attached at one end to housing 36 and at the other end to pivotal member 74 for urging pivotal member 74 into a position as shown in FIG. 3. Biasing means 88 are chosen such that they are capable of pivoting pivotal member 74 in a manner such that the top end of slot 76 contacts the inside of housing 36. However, biasing means 88 are chosen such that when spear 64 contacts and moves along first slot 76 as shown in FIG. 5, spear 64 can pivot pivotal member 74 in a manner so as to allow spear 64 to slide into first chamber 68.

Figure 8:
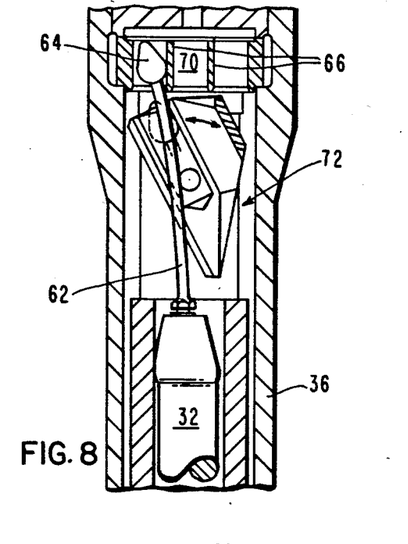
FIGS. 8-11 are cross-sectional views in elevation of the latching mechanism showing the steps of the latching procedure.
Figure 9:
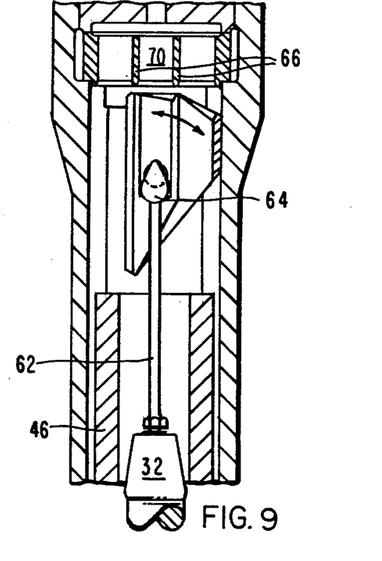

Referring now to FIGS. 8-11, when it is desired to raise drive rod 32 thereby raising displacer rods 34 or other similar devices, valve 44 is opened which allows the pressure in the upper end of housing 36 to drop to about 1950 psi and which allows the reactor coolant inside reactor vessel 12 to exert a force on drive rod 32, which causes drive rod 32 to move upwardly toward cap 38. Since the pressure in reactor vessel 12 is normally about 2250 psi, this pressure acting on the lower end of drive rod 32 creates a force of approximately 700 lbs. on drive rod 32 which causes the lifting action. Since second piston rings 50 create a relatively tight seal between drive rod 32 and bearing housing 46, drive rod 32 is raised at a slow rate with respect to bearing housing 46. For example, under a force of approximately 700 lbs., drive rod 32 will rise at a rate of approximately 1 ft/sec. This slow rate of rise, eliminates the need to have a slowing mechanism such as a fluid dashpot attached to or associated with drive rod 32 to slow its rise. The relatively tight seal of second piston rings 50 with drive rod 32 also limits the amount of reactor coolant that passes therebetween so that adjusting valve 44 can effectively control the rate of movement of drive rod 32. As drive rod 32 rises, spear 64 contacts first slot 76 and rides therealong as shown in FIG. 5. Spear 64 exerts a force on pivotal member 74 so as to pivot pivotal member 74 when spear 64 passes the location of pins 86. This pivoting motion allows spear 64 to pass beyond pivotal member 74 and into first chamber 68 as shown in FIG. 8. As spear 64 passes pivotal member 74, flexible rod 62 passes through first slot 76 and into first bore 78. As flexible rod 62 passes into first bore 78, pivotable member 74 is pivoted back into its original position under the action of biasing means 88 as shown in FIG. 8. Next, valve 44 is closed and the weight of drive rod 32 and the members attached thereto cause drive rod 32 to slowly slide downwardly within bearing housing 46 such that spear 64 enters first bore 78 as shown in phantom in FIG. 8. As spear 64 continues downwardly into first bore 78, it causes pivotal member 74 to pivot into a position as shown in FIG. 9. The downward slide of drive rod 32 and spear 64 is halted when spear 64 reaches ledge 82 at the bottom of first bore 78. Ledge 82 at the bottom first bore 78 holds spear 64 therein. When in this position as shown in FIG. 9, pivotal member 74 has been pivoted such that first bore 78 is in alignment with second chamber 70. Also, when in the position as shown in FIG. 9, spear 64 and drive rod 32 are in the raised position with displacer rods 34 fully withdrawn from core 20. Also, when in this position, drive rod 32 is locked in the up position. This position may be maintained as long as it is desired to have displacer rods 34 out of core 20.

Figure 10:
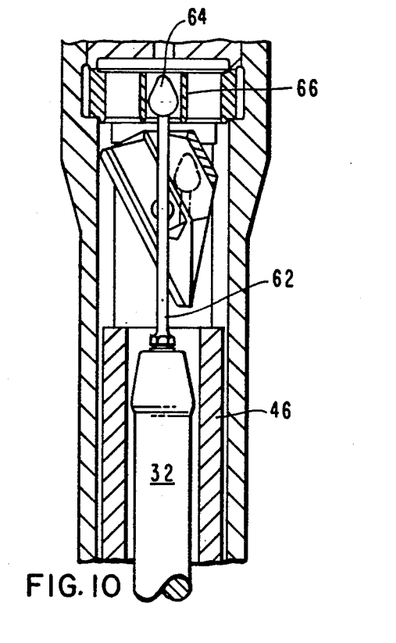
Figure 11:
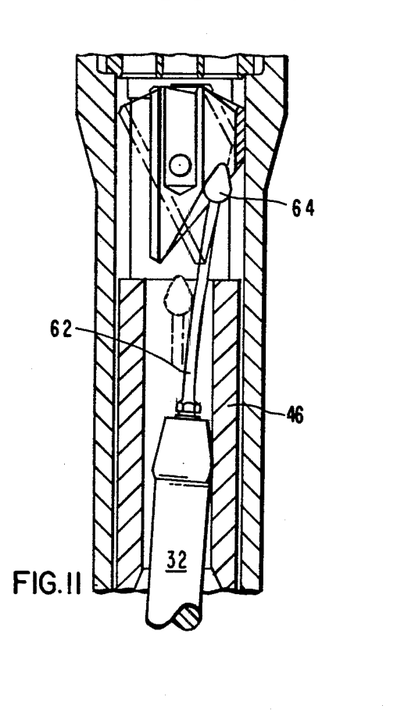

Referring now to FIGS. 9–11, when it is desired to lower displacer rods 34 into core 20, valve 44 is again opened which allows reactor coolant to flow through housing 36, channel 40, and conduit 42. This allows drive rod 32 to again rise with respect to housing 36. As drive rod 32 rises, spear 64 rises into second chamber 70. When spear 64 has risen into second chamber 70, spear 64 contacts cap 38 which prevents further rise of drive rod 32 as shown in FIG. 10. Once again, when spear 64 has passed beyond pivotal member 74, pivotal member 74 is pivoted into contact with housing 36 and flexible rod 62 extends through second slot 84 as shown in FIG. 10. Next, valve 44 can be closed which allows the pressure on both ends of drive rod 32 to reach the same level. Once the pressure has thus reached the same level, the weight of drive rod 32 and mechanisms attached thereto, cause drive rod 32 to slowly move downwardly with respect to housing 36. As drive rod 32 moves downwardly, spear 64 enters second bore 80 as shown in FIG. 10 in phantom. As spear 64 passes through second bore 80, it exerts a force on pivotal member 74 which causes pivotal member 74 to pivot into a position as shown in FIG. 11. Since second bore 80 extends through the entire length of pivotal member 74, the downward slide of spear 64 is not halted. Rather, spear 64 and drive rod 32 continue to fall through bearing housing 46 until displacer rods 34 have reached their maximum low position, thus fully inserting displacer rods 34 in core 20. Therefore, it can be seen that invention provides an hydraulic drive mechanism by which a member can be held in an upper or lower position with respect to the reactor core.

We claim:

1. An hydraulic drive mechanism comprising:
   a substantially elongated cylindrical drive housing;
   a pivotable member pivotably attached to said drive housing and having a first slot, a first bore, and a second slot therein with each extending from the top to the bottom ends of said pivotable member with said first slot being defined along one edge of said pivotable member and extending into said first bore, with said first bore being defined adjacent to and substantially parallel with but not in colinear alignment with said first slot and having a ledge therein, and with said second slot being defined along the length of said first bore;
   biasing means attached to said pivotable member for pivoting said pivotable member relative to said drive housing;
   a contact member having a head on one end thereof with said head being capable of passing into said first bore and not being capable of passing through said first slot and said second slot, with said contact member being capable of being inserted through said first slot, said first bore, and said second slot and with said head being capable of being captured by said ledge in said first bore;
   a drive shaft attached to said contact member and disposed within said drive housing for moving said head into contact with said pivotable member thereby pivoting said pivoting member relative to said drive housing thereby allowing said head to be inserted in said first bore while said contact member passes through said first slot thus latching said contact member to said pivotable member;
   bearing means mounted on a substantially elongated cylindrical bearing housing and removably disposed within said drive housing and around said drive shaft for maintaining alignment of said drive shaft in said drive housing;
   seal means removably attached to said bearing means and disposed in contact with said drive shaft for limiting the flow of an hydraulic fluid between said seal means and said drive shaft; and
   an hydraulic fluid source for providing said hydraulic fluid and connected to said drive housing for providing hydraulic pressure for moving said drive shaft relative to said drive housing, said bearing housing, said bearing means, and said seal means.

2. The hydraulic drive mechanism according to claim 1 wherein said bearing means comprises:
   roller element bearings disposed in said bearing housing and in contact with said drive shaft for maintaining alignment of said drive shaft with respect to said drive housing.

3. The hydraulic drive mechanism according to claim 2 wherein said bearing means further comprises a plurality of piston seal rings disposed around the outside of said bearing housing and in contact with the inside of said drive housing for limiting the flow of said hydraulic fluid between said bearing housing and said drive housing.

4. The hydraulic drive mechanism according to claim 3 wherein said seal means comprises a plurality of piston seal rings removably disposed in said bearing housing and in contact with said drive shaft for limiting the flow of said hydraulic fluid between said drive shaft and said bearing housing.

5. The hydraulic drive mechanism according to claim 4 wherein said hydraulic drive mechanism further comprises valve means connected to said drive housing for selectively allowing said hydraulic fluid to pass therethrough thereby changing the fluid pressure across said seal means thereby allowing said drive shaft to move relative to said drive housing under the influence of said hydraulic fluid pressure.

6. The hydraulic drive mechanism according to claim 5 wherein said pivotable member has a second bore therein extending from the top to the bottom ends thereof for allowing said contact member and said head to pass therethrough thereby disconnecting said contact member from said pivotable member.

7. The hydraulic drive mechanism according to claim 6 wherein said contact member is a flexible rod.

8. The hydraulic drive mechanism according to claim 7 wherein said head is a spear-shaped member.

9. The hydraulic drive mechanism according to claim 8 wherein said biasing means comprises a coil spring attached to said pivotable member and to said drive housing for pivoting said pivotable member.

* * * * *